US009623325B2

(12) United States Patent
Scheer

(10) Patent No.: US 9,623,325 B2
(45) Date of Patent: Apr. 18, 2017

(54) DYNAMIC GAME GENERATION FOR DELIVERY OF TARGETED CONTENT

(71) Applicant: Verizon Patent and Licensing Inc., Basking Ridge, NJ (US)

(72) Inventor: Fred Scheer, Bradford, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 651 days.

(21) Appl. No.: 14/054,319

(22) Filed: Oct. 15, 2013

(65) Prior Publication Data
US 2015/0105145 A1    Apr. 16, 2015

(51) Int. Cl.
*A63F 13/00* (2014.01)
*A63F 13/335* (2014.01)
*A63F 13/79* (2014.01)
*A63F 13/61* (2014.01)

(52) U.S. Cl.
CPC ............ *A63F 13/335* (2014.09); *A63F 13/61* (2014.09); *A63F 13/79* (2014.09)

(58) Field of Classification Search
CPC .......................... A63F 13/79; A63F 2300/535
See application file for complete search history.

(56) References Cited

U.S. PATENT DOCUMENTS

| 2003/0126035 A1* | 7/2003 | Kake | A63F 13/10 463/31 |
| 2007/0072678 A1* | 3/2007 | Dagres | G07F 17/32 463/42 |
| 2008/0215429 A1* | 9/2008 | Ramer | G06F 17/30967 705/14.54 |

OTHER PUBLICATIONS

Wikipedia, "Gamification", http://en.wikipedia.org/w/index.php?title=Gamification&oldid=571703951, Sep. 5, 2013, 9 pages.
Wikipedia, "Recommender System", http://en.wikipedia.org/w/index.php?title=Recommender_system&oldid=567713768, Aug. 8, 2013, 9 pages.

* cited by examiner

*Primary Examiner* — David L Lewis
*Assistant Examiner* — Eric M Thomas

(57) ABSTRACT

One or more first devices may determine a first content file associated with viewing history information of a particular user account; determine one or more second content files that are related to the particular content file; generate a game that includes elements from the particular content file and the one or more second content files; provide the game for display on a second device within a user interface associated with a gaming application; and provide information associated with the particular content file based on providing the game for display on the second device.

20 Claims, 7 Drawing Sheets

| Asset ID 410 | Promotion 420 | Ranking 430 | Gaming Application 440 | Content Information 450 |
|---|---|---|---|---|
| Asset 1 | X | 92/100 | Trivia Game 1 | Weblink 1 |
| Asset 2 |   | 94/100 | Arcade Game 1 | Weblink 2 |
| Asset 3 | X | 85/100 | Role Playing Game 1 | Content Page |

400

DYNAMIC GAME GENERATION FOR DELIVERY OF TARGETED CONTENT

BACKGROUND

Content providers can provide content (e.g., audio content, video content, web content, etc.) to user devices over a network. A user may maintain a user account with a content provider in order to access content via a content platform. When accessing content, the content provider may store the user's content viewing history and provide recommended content that the user may be interested in viewing based on the user's content viewing history. The recommended content may be presented in a list on the content platform and some recommended content may go unnoticed if the presentation of the recommended content does not capture the user's attention.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a user with information, associated with particular content, via an interactive gaming application, such as a trivia gaming application, an arcade gaming application, or the like. In some implementations, the interactive gaming application may be dynamically generated and may include elements associated with the particular content (e.g., an object, a character, a description, a theme, an image, a trivia question, or an animation associated with the particular content). Further, the interactive gaming application may include elements associated with content related to the particular content. In some implementations, the interactive gaming application may encourage a user to select to receive the information associated with the particular content by engaging the user in a game that includes elements from the particular content.

Figure 1:
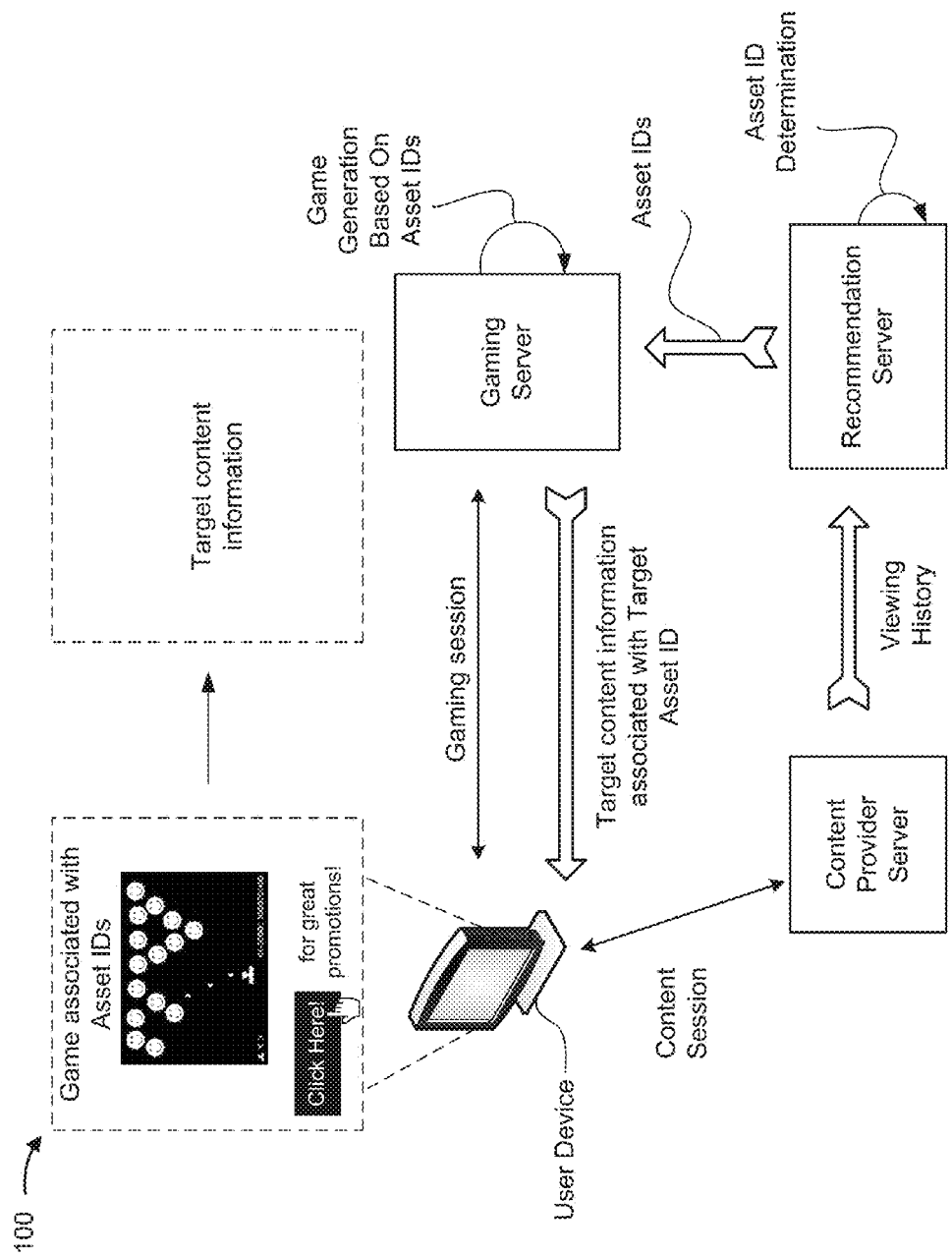
FIG. 1 illustrates an example overview of an implementation described herein.

FIG. 1 illustrates an example overview of an implementation described herein. In FIG. 1, a content provider server may establish a content session with a user device (e.g., when the user device provides login information to the content server associated with a particular user account) to permit a user to select and receive content files via a content platform that may be displayed on a user interface of the user device. For example, each content file may correspond to a particular movie, television show, song, or the like. In some implementations, the content provider server may log viewing history information corresponding to content file selections received by the user device, such as selections to view, purchase, or rent a content file. In some implementations, the content provider server may provide the viewing history information to a recommendation server.

In some implementations, the recommendation server may identify a group of recommended content files that are related to content files identified in the viewing history information (e.g., content files associated with the same genre, actors, producers, directors, etc., as content files identified in the viewing history information and/or content files that have been historically selected to be viewed after the content files identified by the viewing history have been selected to be viewed). For example, the recommendation server may identify asset identifiers (IDs) associated with the recommended content files (e.g., with each asset ID identifying a respective recommended content file).

In some implementations, the recommendation server may determine a particular recommended content file (e.g., a target content file) and the associated asset ID of the target content file (e.g., a target asset ID). In some implementations, the target content file may be determined from the group of recommended content files based on which of the recommended content files is currently associated with a promotion, user ratings of the recommended content files, and/or some other attributes of the recommended content files. In some implementations, the target content file may be determined such that information, associated with the target content file, may be provided when a user selects to receive the targeted content via an interactive gaming application.

In some implementations, the recommendation server may identify content files related to the target content file (e.g., related content files) and the associated asset IDs of the related content files (e.g., related asset IDs). For example, the recommendation server may identify content files that are associated with the same genre, similar actors, producers, directors, etc., as the target content file and/or content files that have been historically selected to be viewed after the target content file has been selected to be viewed. In some implementations, the recommendation server may provide the asset IDs of the target content file and of the related content files to a gaming server.

In some implementations, the gaming server may dynamically generate a game based on the asset IDs. In some implementations, the gaming server may generate a game with elements associated with the target content file and the related content files. As an example, the gaming server may generate a multiple choice trivia game that identifies the target content file and the related content files as possible answer choices to a trivia question that the user may select to answer (e.g., a trivia question whose answer is the name of a movie or television show associated with the target content file).

As another example, the gaming server may generate an arcade game that includes elements from the target content file and the related content file, such as main characters from characters associated with the target content file, and side characters from characters associated with the related content files. In some implementations, the gaming server may establish a gaming session with the user device, provide the game for presentation on the user device via a gaming application (e.g., as shown in interface 100), and may receive user inputs, associated with the game, via the gaming session and gaming application. In the example shown in interface 100 of FIG. 1, the game may include an arcade game having images of characters from the target content file and one or more of the related content files.

At any point while the gaming session is active (e.g., while the game is being presented, and/or at the conclusion of the game), the user device may present an option within the gaming application to receive information regarding the target content file (e.g., promotional information to purchase or rent the target content file at a discount, a synopsis associated with a movie or television show corresponding to the target content file, merchandise associated with the target content file, or the like). In some implementations, the gaming application may encourage a user to select to receive the information associated with the target content file by engaging the user in a game that is dynamically generated and includes elements from the target content file and the related content files.

As used herein, the term "content file" may correspond to a single object, or a group of objects associated with a single entity (e.g., a single television show, movie, song, etc.). For example, a content file may correspond to a group of objects having different bitrates (e.g., for when a content file is provided to a user device using an adaptive bitrate (ABR) technique).

Figure 2:
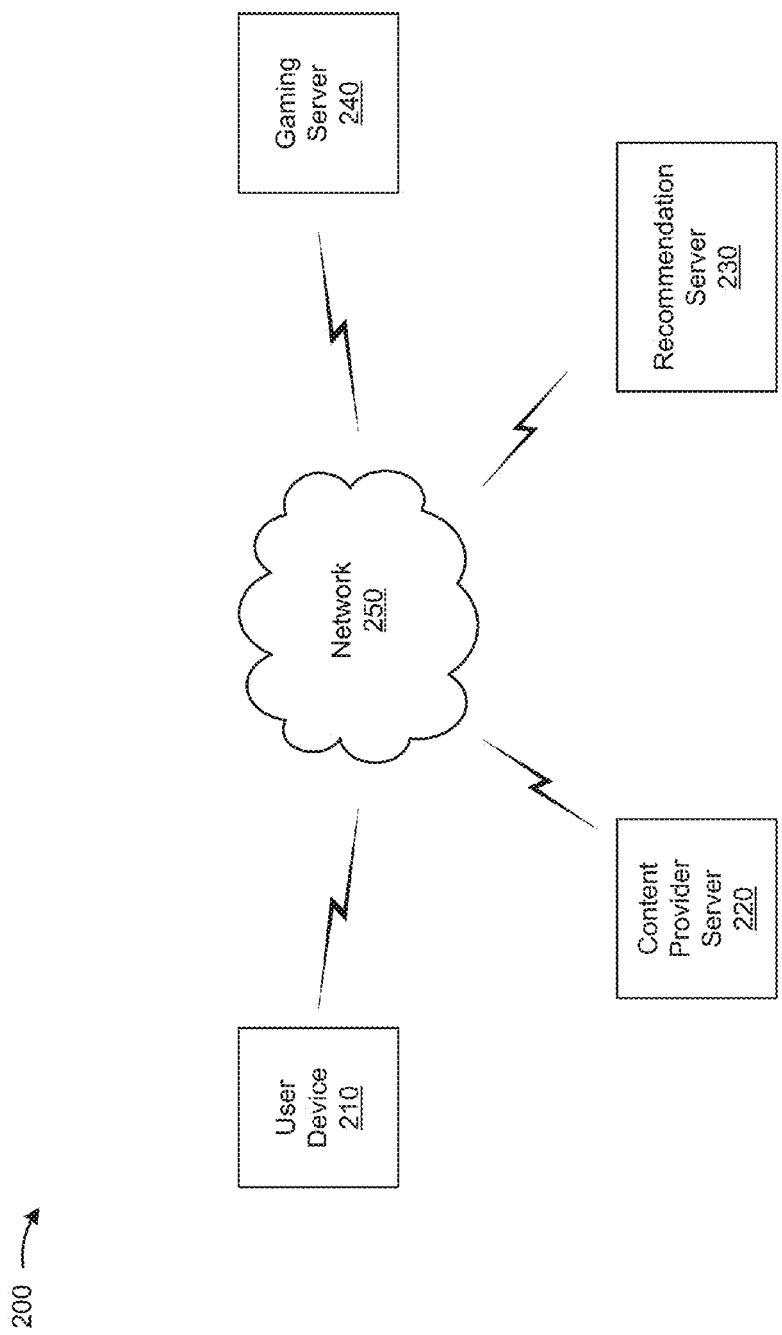
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, content provider server 220, recommendation server 230, gaming server 240, and network 250.

User device 210 may include any device capable of communicating via a network, such as network 250. For example, user device 210 may correspond to a mobile communication device (e.g., a smart phone or a personal digital assistant (PDA)), a portable computer device (e.g., a laptop or a tablet computer), a gaming device, a set-top box, a desktop computing device, or another similar type of device. In some implementations, user device 210 may communicate with content provider server 220 to request content via a content platform. In some implementations, user device 210 may communicate with gaming server 240 to receive data relating to a game generated by gaming server 240 via a gaming session. Further, user device 210 may receive information regarding a target content file based on receiving a selection to receive the information. In some implementations, the selection may be received from within a gaming application.

Content provider server 220 may include one or more computing devices, such as a server device or a collection of server devices. In some implementations, content provider server 220 may store content that may be provided to user device 210. For example, content provider server 220 may receive account information from user device 210 to identify a user account, and may provide a list of content that may be selected via a content platform. In some implementations, content provider server 220 may store viewing history information for a particular user account based on selections for content received from user device 210.

Recommendation server 230 may include one or more computing devices, such as a server device or a collection of server devices. In some implementations, recommendation server 230 may receive viewing history information from content provider server 220 and may identify a group of recommended content files that are related to content files identified in the viewing history information (e.g., content files associated with the same genre, actors, producers, directors, etc., as content files identified in the viewing history information and/or content files that have been historically selected to be viewed after the content files identified by the viewing history have been selected to be viewed). For example, the recommendation server 230 may identify asset identifiers IDs associated with the recommended content files (e.g., with each asset ID identifying a respective recommended content file. As described above, recommendation server 230 may determine a particular recommended content file (e.g., a target content file) and the associated asset ID of the target content file (e.g., a target asset ID). Further, recommendation server 230 may identify content files related to the target content file, and may provide the asset IDs of the related content files (e.g., related asset IDs) to gaming server 240.

Gaming server 240 may include one or more computing devices, such as a server device or a collection of server devices. In some implementations, gaming server 240 may receive a target asset ID and related asset IDs and generate a game having elements associated with the target asset ID and the related asset IDs. For example, gaming server 240 may generate a trivia game, an arcade game, a roll playing game, or the like. In some implementations, gaming server 240 may establish a gaming session with user device 210 and provide the game for display on user device 210 via a gaming application executing on user device 210. In some implementations, gaming server 240 may provide information regarding the target content file, associated with the target asset ID, based on receiving a request for the information regarding the content file via the gaming application.

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
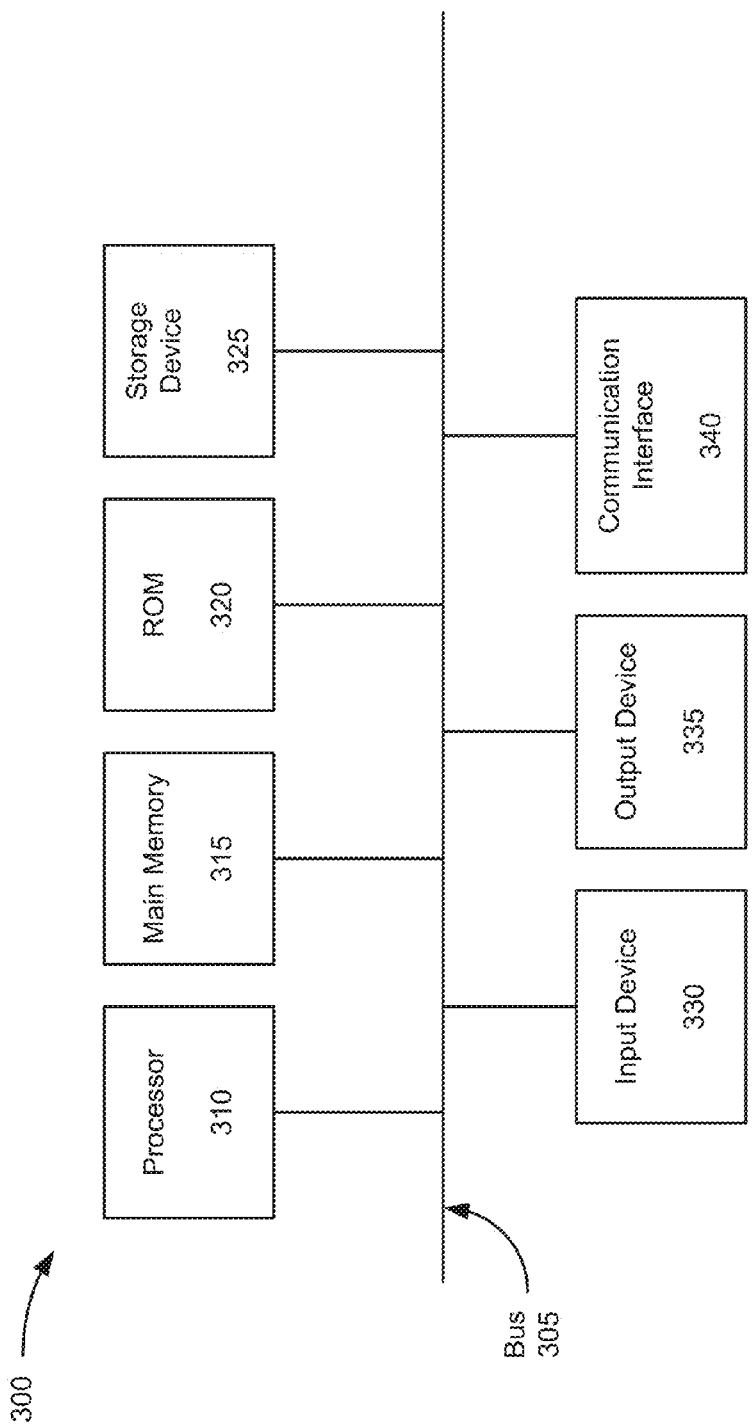
FIG. 3 illustrates example components of a device that may be used within the environment of FIG. 2.

FIG. 3 illustrates example components of a device 300 that may be used within environment 200 of FIG. 2. Device 300 may correspond to user device 210, content provider server 220, recommendation server 230, and/or gaming server 240. Each of user device 210, content provider server 220, recommendation server 230, and/or gaming server 240 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
FIG. 4 illustrates an example data structure that may be stored by one or more devices in the environment of FIG. 2.

FIG. 4 illustrates an example data structure 400 that may be stored by one or more devices in environment 200, such as recommendation server 230 and/or gaming server 240. In some implementations, data structure 400 may be stored in a memory of recommendation server 230 and/or gaming server 240. In some implementations, data structure 400 may be stored in a memory separate from, but accessible by, recommendation server 230 and/or gaming server 240. In some implementations, data structure 400 may be stored by some other device in environment 200, such as user device 210 and/or content provider server 220. In some implementations, a portion of data structure 400 may be stored by one device in environment 200, and another portion of data structure 400 may be stored by another device in environment 200.

A particular instance of data structure 400 may contain different information and/or fields than another instance of data structure 400. In some implementations, one instance of data structure 400 may identify content files associated with viewing history information for a particular user account. Another instance of data structure 400 may identify content files associated with viewing history information for another user account. In some implementations, recommendation server 230 may identify a target asset ID based on information stored by data structure 400.

Each entry in data structure 400 may identify an asset ID of a content file stored by content provider server 220, information identifying whether the content file is currently being promoted, a ranking score of the content file, a gaming application associated with the content file, and content information associated with the content file (e.g., information that may be provided when the content file is determined as a target content file and when a request to receive the information for the content file is received from user device 210 via a gaming application).

As shown in FIG. 4, data structure 400 may include asset ID field 410, promotion field 420, ranking field 430, gaming application field 440, and content information field 450.

Asset ID field 410 may store asset IDs of content files stored by content provider server 220 and available for selection by user device 210 via a content platform. In some implementations, information stored by asset ID field 410 may include a string of characters of any format and length and may include a description of a content file and/or some other information that may uniquely identify the content file.

Promotion field 420 may store information to indicate that a corresponding content file is currently being promoted. For example, promotion field 420 may store an "X" to indicate that the corresponding content file is currently being promoted. In some implementations, a publisher of the content file may request to promote the content file in exchange for payment (e.g., such that the content file may be selected by recommendation server 230 as a target content file).

Ranking field 430 may identify a value generated based on user ratings of the content file, viewing history information, and/or some other information. In some implementations, the value may be proportional to a prediction of a user's interest in the content file based on the user ratings and/or the viewing history information.

Gaming application field 440 may identify a gaming application associated with the content file. For example, gaming application field 440 may store information identifying a trivia gaming application, an arcade gaming application, a role playing gaming application, or the like. In some implementations, gaming server 240 may generate a particular type of game based on the type of gaming application identified in gaming application field 440. In some implementations, the gaming application may include a framework with customizable parameters that may be generated based on elements included in a target content file and related content files. For example, for a trivia gaming application associated with the content file identified by the asset ID "Asset 1," the framework may include a trivia question relating to the content file of "Asset 1" with the customizable parameters being the titles of movies or television shows associated with the target content file and/or the related content files as answer choices to the trivia question. For an arcade gaming application, the customizable parameters may include backgrounds and/or characters associated with the target content file and/or the related content files. In some implementations, the gaming application may be in the form of a web application based on a hypertext markup language (HTML), such as an HTML5 markup language and/or some other markup language.

Content information field 450 may identify target content information that may be provided to user device 210 based on receiving a request to receive the target content information (e.g., via gaming application and/or a gaming session). In some implementations, content information field 450 may include a link to the target content information, a web page having the target content information, and/or some other information relating to the target content information.

As described above, data structure 400 may identify a group of recommended content files associated with viewing history information for a particular user account. As an example, assume that, based on viewing history information associated with the particular user account, recommendation server 230 determines recommended content files corresponding to the asset IDs "Asset 1," "Asset 2," and "Asset 3." Given this assumption, data structure 400 may store the asset IDs "Asset 1," "Asset 2," and "Asset 3" identifying the recommended content files for the particular user account.

In some implementations, recommendation server 230 may determine a particular content file (e.g., a target content file) in the group of recommended content files based on information stored by promotion field 420 and ranking field 430. For example, recommendation server 230 may determine the target content file based on which content files are currently being promoted. If multiple content files are currently being promoted, recommendation server 230 may determine the content file having the highest ranking score. If multiple content files are currently being promoted and have the same ranking score, recommendation server 230 may randomly select the target content file, select the target file using a round-robin technique, or select the target content file using some other technique. As described above, recommendation server 230 may identify related asset IDs, associated with the target content file, provide the asset ID of the target content file (e.g., the target asset ID) and the related asset IDs to gaming server 240.

In some implementations, gaming server 240 may generate a particular type of game based on information stored by gaming application field 440 and may generate the game based on the target asset ID and the related asset ID. Further, gaming server 240 may provide target content information corresponding to information stored by content information field 450.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
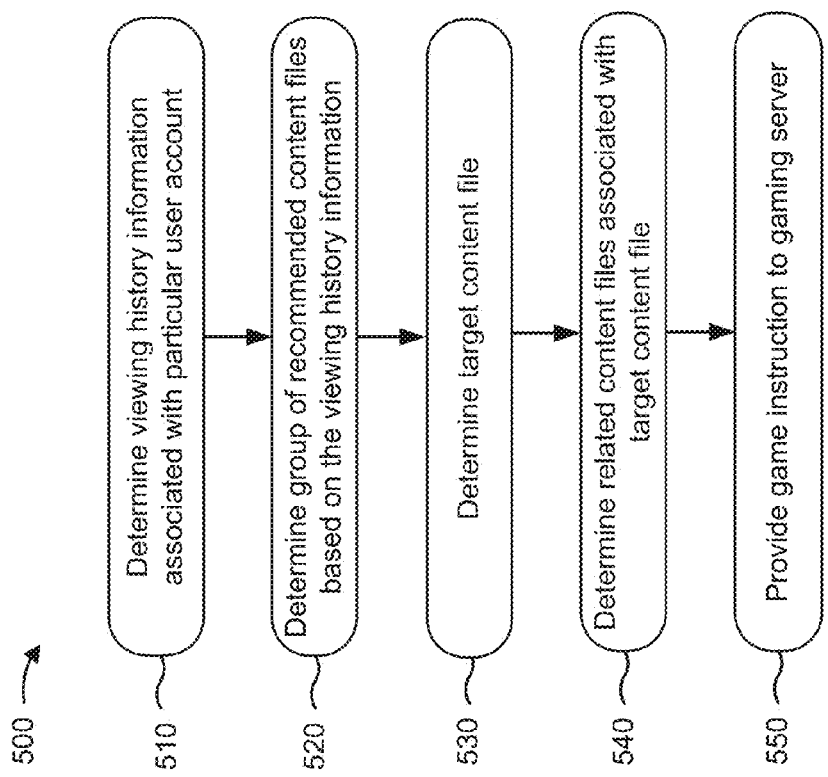
FIG. 5 illustrates a flowchart of an example process for determining a target asset identifier and related asset identifiers.

FIG. 5 illustrates a flowchart of an example process 500 for determining a target asset identifier and related asset identifiers. In one implementation, process 500 may be performed by one or more components of recommendation server 230. In another implementation, some or all of the blocks of process 500 may be performed by one or more components of another device in environment 200 (e.g., user device 210, content provider server 220, and/or gaming server 240), or a group of devices including or excluding recommendation server 230.

As shown in FIG. 5, process 500 may include determining viewing history information associated with a particular user account (block 510). For example, recommendation server 230 may determine the viewing history based on receiving information corresponding to the viewing history from content provider server 220. In some implementations, the viewing history information may identify the particular user account and selections for content files associated with the particular user account. In some implementations, the viewing history information may identify portions of the content files that were provided to user device 210 (e.g., indicating time instances at which particular content files were accessed).

Process 500 may also include determining a group of recommended content files based on the viewing history information (block 520). For example, recommendation server 230 may determine the group of recommended content files as those content files associated with the same genre, actors, producers, directors, etc., as content files identified in the viewing history information and/or content files that have been historically selected to be viewed after the content files identified by the viewing history have been selected to be viewed. In some implementations, information regarding the group of recommended content files may be stored in data structure 400.

Process 500 may further include determining a target content file (block 530). For example, recommendation server 230 may determine a particular content file in the group of recommended content files (e.g., a target content file) based on information stored by promotion field 420 and ranking field 430. For example, recommendation server 230 may determine the target content file based on which content files are currently being promoted. If multiple content files are currently being promoted, recommendation server 230 may determine the content file having the highest ranking score. If multiple content files are currently being promoted and have the same ranking score, recommendation server 230 may randomly select the target content file, select the target file using a round-robin technique, or select the target content file using some other technique. In some implementations, recommendation server 230 may select multiple content files as target content files.

Process 500 may also include determining related content files associated with the target content file (block 540). For example, recommendation server 230 may identify content files that are associated with the same genre, actors, producers, directors, etc., as the target content file and/or content files that have been historically selected to be viewed after the target content file has been selected to be viewed.

Process 500 may further include providing a game instruction to a gaming server (block 550). For example, recommendation server 230 may provide the gaming instruction to gaming server 240 based on determining the target content file and the related content files. In some implementations, the gaming instruction may include an asset ID of the target content file (e.g., a target asset ID) and the asset IDs of the related content files (e.g., the related asset IDs) to gaming server 240. In some implementations, the gaming instruction may further include information identifying the particular user account and an instruction to generate a game based on the target asset ID and the related asset IDs. As described in greater detail blow with respect to FIG. 6, gaming server 240 may generate a game based on the target asset ID and the related asset IDs, provide the game for display on user device 210 via a gaming application, and receive a request, via the gaming application, for information associated with the target content file.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6:
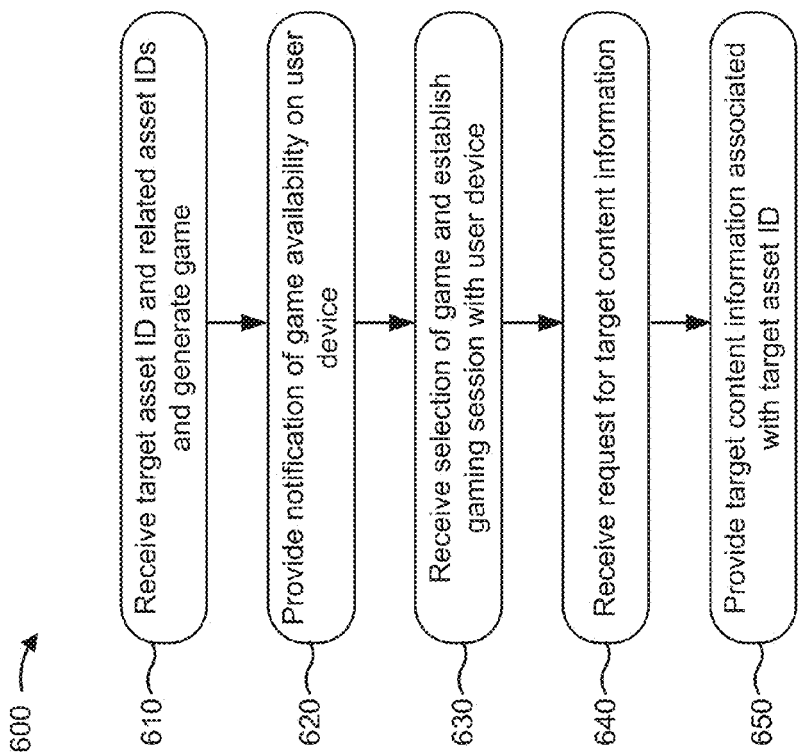
FIG. 6 illustrates a flowchart of an example process for generating a game based on a target asset identifier and related asset identifiers and providing information associated with the target asset identifier.

FIG. 6 illustrates a flowchart of an example process 600 for generating a game based on a target asset ID and related asset IDs and providing information associated with a target content file corresponding to the target asset ID. In one implementation, process 600 may be performed by one or more components of gaming server 240. In another implementation, some or all of the blocks of process 600 may be performed by one or more components of another device in environment 200 (e.g., user device 210, content provider server 220, and/or recommendation server 230), or a group of devices including or excluding gaming server 240.

As shown in FIG. 6, process 600 may include receiving a target asset ID and related asset IDs and generating a game (block 610). For example, gaming server 240 may receive the target asset ID and the related asset IDs from recommendation server 230, as described above with respect to process block 550. In some implementations, gaming server 240 may generate a game based on the target asset ID and the related asset IDs. For example, gaming server 240 may identify a particular gaming application associated with the target asset ID and may modify customizable parameters associated with the gaming application.

As described above with respect to FIG. 4, the customizable parameters may relate to elements associated with a target content file, identified by the target asset ID, and elements associated with related content files, identified by the related asset IDs. In some implementations, the elements may include image files of characters, animations, audio, descriptions, themes, trivia questions, and/or some other type of element that is related to the target content file and the related content files. In some implementations, elements for content files may be stored by an elements repository and may be selected by gaming server 240 when generating the game. For example, the elements repository may identify individual content files, and for each content file, may store elements that gaming server 240 may select to include in a game (e.g., as customizable parameters in the game). In some implementations, gaming server 240 may store the game in a game repository such that the game can be accessed once the game is generated.

In some implementations, a particular content file can be a target content file and a related content file for another target content file. In some implementations, gaming server 240 may generate a game for each content file as if each content file were a target content file. Further, gaming server 240 may store each game, and provide a particular game when gaming server 240 receives a selection of the particular game associated with a particular content file (e.g., when recommendation server 230 identifies the particular content file as a target content file and when user device 210 receives a request for the game of the target content file).

In some implementations, a game associated with a particular content file may be updated when information identifying related content files change. As an example, assume that, at one point in time, recommendation server 230 determines that "Asset 2" and "Asset 3" are related to "Asset 1" and that recommendation server 230 provides information to gaming server 240 that "Asset 2" and "Asset 3" are related to "Asset 1." Given this assumption, gaming server 240 may generate a game for "Asset 1" and may include elements from "Asset 1," "Asset 2," and "Asset 3" in the game. Assume that at a later point in time, recommendation server 230 determines that "Asset 2," "Asset 3," and "Asset 4" are related to "Asset 1." Given this assumption gaming server 240 may update the game for "Asset 1" and may include elements from "Asset 1," "Asset 2," "Asset 3," and "Asset 4" in the game.

Process 600 may also include providing a notification of game availability to a user device (block 620). For example, gaming server 240 may provide a notification of the game's availability based on generating the game. In some implementations, the notification may be displayed in a user interface of user device 210 and may be selected by a user of user device 210 in order to provide the game to user device 210.

Process 600 may further include receiving a selection of the game and establishing a gaming session with the user device (block 630). For example, gaming server 240 may receive a selection of the game from user device 210. Based on receiving the selection, gaming server 240 may establish a gaming session with user device 210 and may provide game related data to user device 210 via the gaming session. In some implementations, user device 210 may present the game related data in a gaming application and may receive user inputs, associated with the game, via the gaming application. In some implementations, the gaming application may present an option to request information associated with the target content (e.g., in the form of a banner, button, or other format).

Process 600 may also include receiving a request for target content information (block 640). For example, gaming server 240 may receive the request for the target content information from user device 210 via the gaming application. In some implementations, gaming server 240 may receive the request at the conclusion of the game or at any time during the game.

Process 600 may further include providing the target content information associated with the target asset ID (block 650). For example, gaming server 240 may identify the target content information based on information stored by content information field 450 and associated with the target asset ID. As described above, the target content information may include a link to a web page having promotional information to purchase or rent the target content file (e.g., the content file associated with the target asset ID) at a discount, a synopsis associated with a movie or television show corresponding to the target content file, merchandise associated with the target content file, or the like. As described above, the game presented in the gaming application may include elements of the target content file to engage a user's interest in the target content file and encourage the user to request to receive the target content information.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel. For example, block 640 may be omitted such that the target content information is provided to user device 210 without receiving the request for the target content information (e.g., the target content information may be provided at the conclusion of the game without receiving the request for the target content information).

Figure 7:
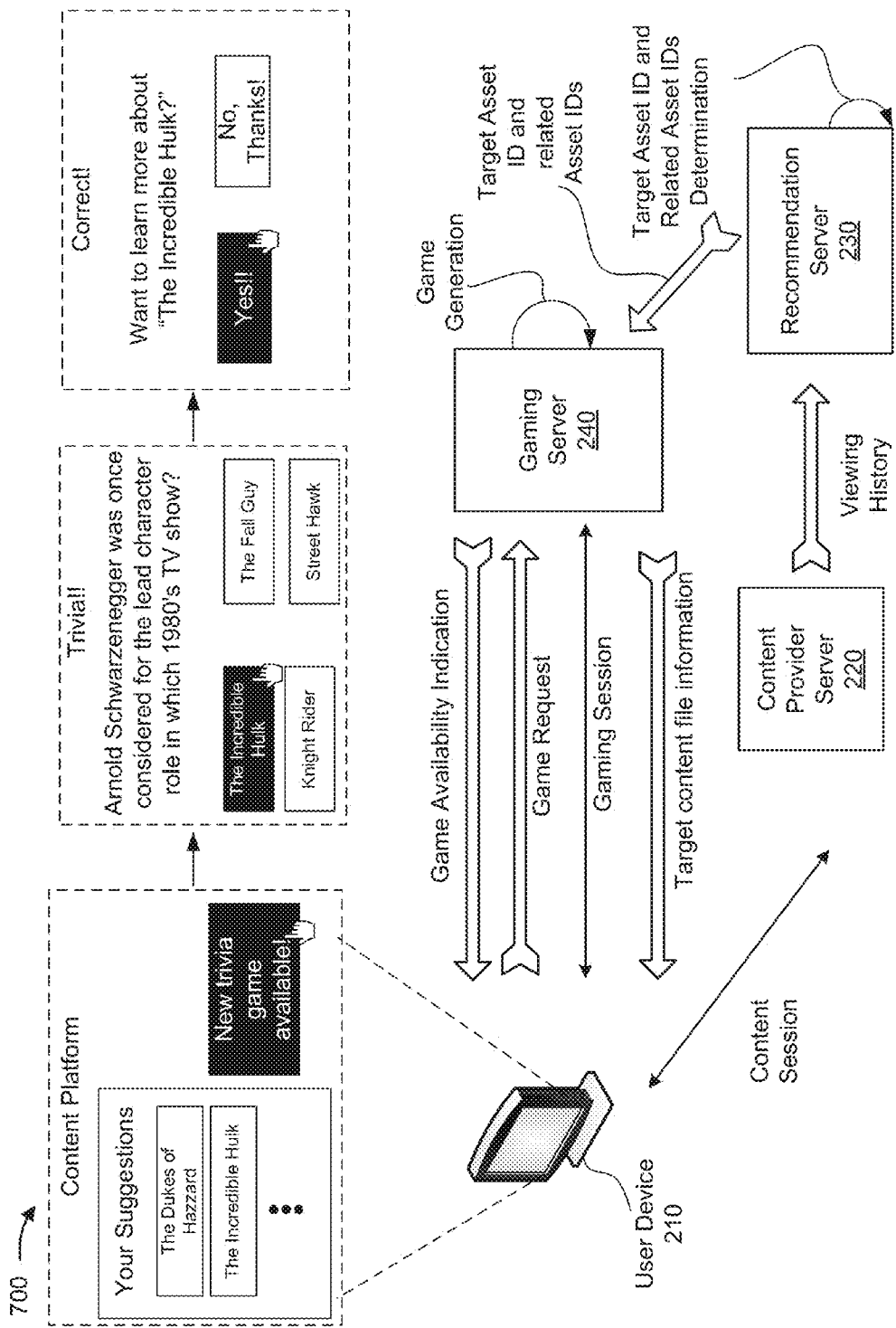
FIG. 7 illustrates an example implementation as described herein.

FIG. 7 illustrates an example implementation as described herein. As shown in FIG. 7, user device 210 and content provider server 220 may communicate via a content session (e.g., when user device 210 provides login information, associated with a particular user account, to content provider server 220 to access content provider server 220 via the content session). In some implementations, user device 210 may present a list of suggested content based on viewing history information associated with the particular user account (e.g., as shown in interface 700). For example, recommendation server 230 may receive the viewing history, from content provider server 220, and provide user device 210 with the list of suggested content. As described above, recommendation server 230 may identify a particular content file in the list of suggested content (e.g. a target content file with a corresponding target asset ID), content files related to the target content file (e.g., related content files with corresponding related asset IDs), and provide the target asset ID and the related asset IDs to gaming server 240.

In some implementations, gaming server 240 may generate a game based on the target asset ID and the related asset IDs, and provide an indication that the game is available to user device 210. In some implementations, user device 210 may present the indication in interface 700 and may receive a request for the game (e.g., from a user of user device 210). In some implementations, user device 210 may provide the request for the game to gaming server 240. In some implementations, gaming server 240 may establish a gaming session and may provide gaming data to user device 210 via the gaming session to cause user device 210 to present the game in a gaming application. In the example shown in FIG. 7, user device 210 may present a trivia game having elements associated with the target content file and the related content files.

In FIG. 7, assume that the target asset ID identifies the television program "The Incredible Hulk" and that the related asset IDs identify the television programs "The Fall Guy," "Knight Rider," and "Street Hawk." Given these assumptions, the trivia game may include a trivia question whose correct answer choice corresponds to the target content file (i.e., "The Incredible Hulk") and whose incorrect answer choices correspond to the related content files (i.e., "The Fall Guy," "Knight Rider," and "Street Hawk").

In some implementations, user device 210 may provide user inputs via the gaming application and gaming server 240 may provide responses to the user inputs. For example, for the trivia game shown in FIG. 7, user device 210 may provide a user input corresponding to a selection of an answer choice. If the user input corresponds to the selection of a correct answer choice, gaming server 240 may respond with a message that indicates that the answer choice is correct and with an option to receive information for the target content file (e.g., information associated with the television show "The Incredible Hulk"). If the user input corresponds to the selection of an incorrect answer choice, gaming server 240 may respond with a message that indicates that the answer choice is incorrect, may provide the correct answer, and may provide the option to receive information for the target content file.

In some implementations, gaming server 240 may receive a request for the information (e.g., via the gaming application and based on providing the option to receive the request for the information), and may provide the information for the target content file. As a result, the game may engage the user's interest in the target content file and encourage the user to request to receive the target content information.

While a particular example is shown in FIG. 7, the above description is merely an example implementation. In practice, other examples are possible from what is described above in FIG. 7. Also, while a particular format of interface 700 is shown, in practice, interface 700 may have a different format and appearance than what is shown in FIG. 7.

As described above, gaming server 240 may dynamically generate a game based on target asset IDs and related asset IDs as inputs to the generation of the game. In some implementations, gaming server 240 may generate a game with elements associated with the target content file and/or the related content files. In some implementations, the game can be presented on user device 210 via a gaming application to encourage a user to select to receive information associated with the target content file by engaging the user in the game that is dynamically generated and includes elements from the target content file and/or the related content files. In some implementations, gaming server 240 may store a user's score, publish the user's score on a leader board, and may provide different target content file information based on the user's score.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    receiving, by one or more processors of one or more first devices and from a server, a first identifier for a first content file associated with viewing history information of a particular user account;
    receiving, by the one or more processors of the one or more first devices and from the server, a second identifier for one or more second content files that are related to the first content file;
    generating, by the one or more processors of the one or more first devices and based on receiving the first identifier and the second identifier, a game by modifying parameters of the game to include one or more elements from the first content file and the one or more second content files;
    providing, by one or more communication interfaces of the one or more first devices and for display on a user interface of a second device, a notification of availability of the generated game;
    receiving, by the one or more communication interfaces of the one or more first devices and from the second device, a selection of the generated game;
    establishing, by the one or more communication interfaces of the one or more first devices, a gaming session with the second device based on receiving the selection of the generated game; and
    providing, by the one or more communication interfaces of the one or more first devices, information associated with the first content file based on establishing the gaming session with the second device.

2. The method of claim 1, further comprising:
    determining a plurality of third content files based on the viewing history information of the particular user account;
    determining a particular content file of the plurality of third content files,
        the particular content file corresponding to the first content file; and
    determine the first content file based on determining the particular content file.

3. The method of claim 2, where determining the particular content file is based on ranking scores of the plurality of third content files, or information indicating promotions associated with the plurality of third content files.

4. The method of claim 1, where the generated game is a trivia game including a trivia question, associated with the first content file, and answer choices corresponding to the first content file or the one or more second content files.

5. The method of claim 1, further comprising:
    receiving, by the one or more processors of the one or more first devices, a request for the information associated with the first content file,
        the request being provided based on receiving a selection of the request from the second device, and
    where providing the information associated with the first content file comprises:
        providing the information associated with the first content file based on receiving the request for the information associated with the first content file.

6. The method of claim 1, where the information associated with the first content file includes at least one of:
    purchase or rental information for the first content file,
    merchandise information associated with the first content file, or
    a description of the first content file.

7. The method of claim 1, where one of the one or more elements includes:
    an object associated with the first content file or at least one of the one or more second content files,
    a character associated with the first content file or at least one of the one or more second content files,
    a description associated with the first content file or at least one of the one or more second content files,
    a theme associated with the first content file or at least one of the one or more second content files,
    an image associated with the first content file or at least one of the one or more second content files,
    a trivia question associated with the first content file or at least one of the one or more second content files, or
    an animation associated with the first content file or at least one of the one or more second content files.

8. A system comprising:
    one or more first devices comprising:
        a memory storing instructions; and
        a processor to execute the instructions to:
            receive, from a server, a first identifier for a plurality of first content files based on viewing history information of a particular user account;
            determine a particular content file of the plurality of first content files;
            receive, from the server, a second identifier for one or more second content files that are related to the particular content file;
            generate, based on receiving the first identifier and the second identifier, a game by modifying parameters of the game to include one or more elements from the particular content file and the one more second content files;
            provide, for display on a user interface of a second device, a notification of availability of the generated game;
            receive, from the second device, a selection of the generated game;
            establish a gaming session with the second device based on receiving the selection of the generated game; and
            provide information associated with the particular content file based on establishing the gaming session with the second device.

9. The system of claim 8, where, when determining the particular content file, the processor is to:
    determine the particular content file based on ranking scores of the plurality of first content files, or information indicating promotions associated with the plurality of first content files.

10. The system of claim 8, where the game is a trivia game including a trivia question, associated with the particular content file, and answer choices corresponding to the particular content file or at least one or more of the second content files.

11. The system of claim 8, where the processor is further to:
    receive a request for the information associated with the particular content file,
        the request being provided based on receiving a selection of the request from the second device; and
    where, when providing the information associated with the particular content file, the processor is to:
        provide the information associated with the particular content file based on receiving the request for the information.

12. The system of claim 8, where the information associated with the particular content file includes at least one of:
   purchase or rental information for the particular content file,
   merchandise information associated with the particular content file, or
   a description of the particular content file.

13. The system of claim 8, where one of the one or more elements includes:
   an object associated with the particular content file or at least one of the one or more second content files,
   a character associated with the particular content file or at least one of the one or more second content files,
   a description associated with the particular content file or at least one of the one or more second content files,
   a theme associated with the particular content file or at least one of the one or more second content files,
   an image associated with the particular content file or at least one of the one or more second content files,
   a trivia question associated with the particular content file or at least one of the one or more second content files, or
   an animation associated with the particular content file or at least one of the one or more second content files.

14. A non-transitory computer-readable medium for storing instructions, the instructions comprising:
   a plurality of instructions which, when executed by one or more processors associated with one or more first devices, cause the one or more processors to:
      receive, from a server, a first identifier for a first content file associated with viewing history information of a particular user account;
      receive, from a server, a second identifier for one or more second content files that are related to the first content file;
      generate, based on receiving the first identifier and the second identifier, a game by modifying parameters of the game to include one or more elements from the first content file and the one or more second content files;
      provide, for display on a user interface of a second device, a notification for identifying the generated game;
      receive, from the second device, a request for the generated game based on providing the notification;
      establishing a gaming session with the second device based on receiving the request for the generated game; and
      provide information associated with the first content file based on providing the generated game for display on the second device.

15. The non-transitory computer-readable medium of claim 14, where the plurality of instructions, when executed by the one or more processors, further cause the one or more processors to:
   determine a plurality of third content files based on the viewing history information of the particular user account;
   determine a particular content file of the plurality of third content files,
      the particular content file corresponding to the first content file; and
   determine the first content file based on determining the particular content file.

16. The non-transitory computer-readable medium of claim 15, where the plurality of instructions, when determining the particular content file, cause the one or more processors to:
   determine the particular content file based on ranking scores of the plurality of third content files, or information indicating promotions associated with the plurality of third content files.

17. The non-transitory computer-readable medium of claim 14, where the game is an arcade game including at least one of:
   a theme associated with the first content file or at least one of the one or more second content files,
   a character associated with the first content file or at least one of the one or more second content files,
   an image associated with the first content file or at least one of the one or more second content files, or
   an animation associated with the first content file or at least one of the one or more second content files.

18. The non-transitory computer-readable medium of claim 14, where one of the one or more elements includes:
   an object associated with the first content file or at least one of the one or more second content files,
   a character associated with the first content file or at least one of the one or more second content files,
   a description associated with the first content file or at least one of the one or more second content files,
   a theme associated with the first content file or at least one of the one or more second content files,
   an image associated with the first content file or at least one of the one or more second content files,
   a trivia question associated with the first content file or at least one of the one or more second content files, or
   an animation associated with the first content file or at least one of the one or more second content files.

19. The method of claim 1, where the first content file includes information associated with at least one of:
   a genre,
   an actor,
   a producer, or
   a director.

20. The system of claim 8, where the processor is further to:
   provide, to the second device, gaming data to cause the second device to present the game on the user interface.

* * * * *